Jan. 15, 1952     E. L. POTTER     2,582,455
STEERING MECHANISM
Filed Feb. 24, 1947     3 Sheets-Sheet 1
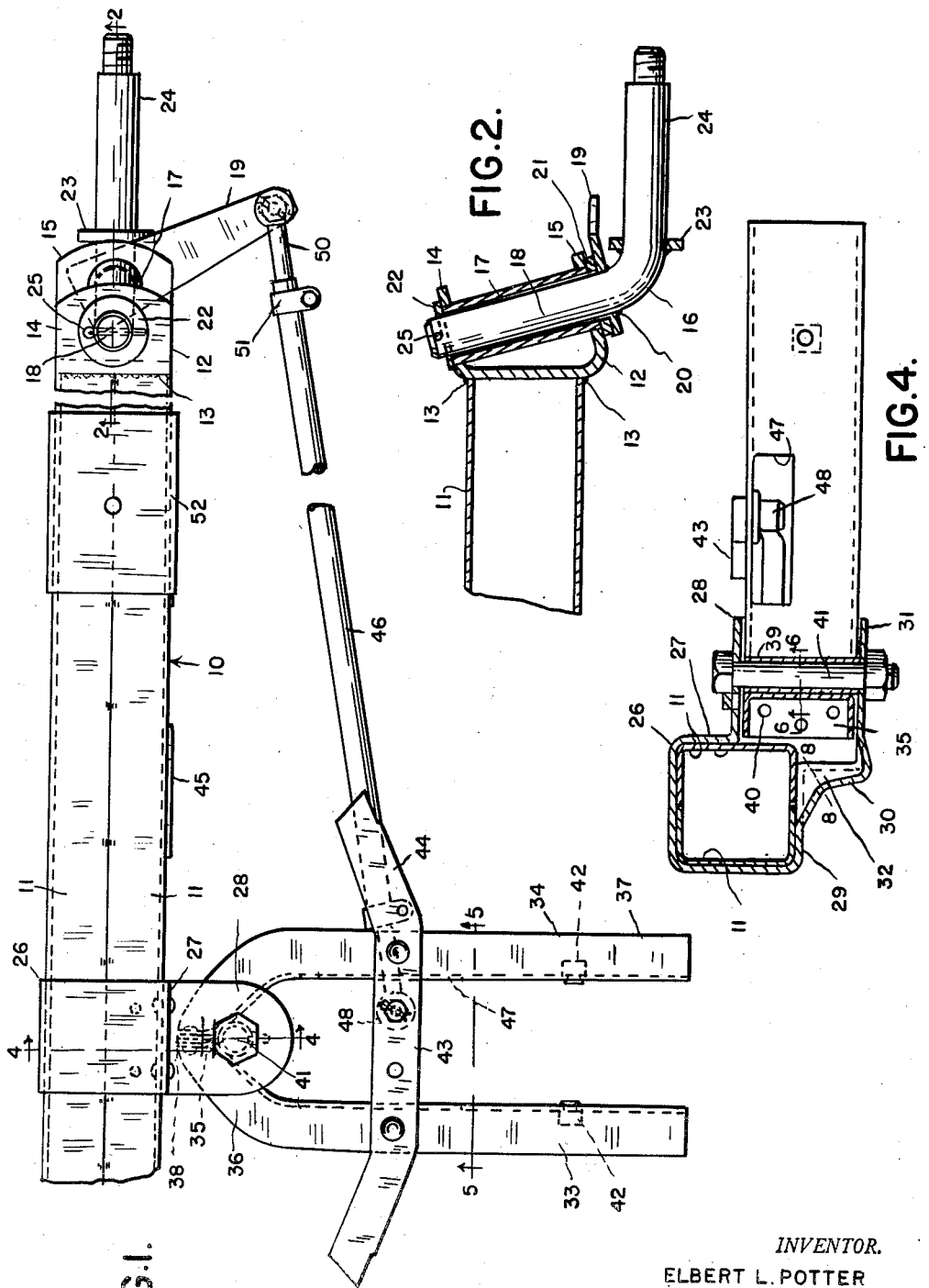
INVENTOR.
ELBERT L. POTTER
BY
Whittemore Hulbert & Belknap
ATTORNEYS Jan. 15, 1952     E. L. POTTER     2,582,455
STEERING MECHANISM
Filed Feb. 24, 1947     3 Sheets-Sheet 2
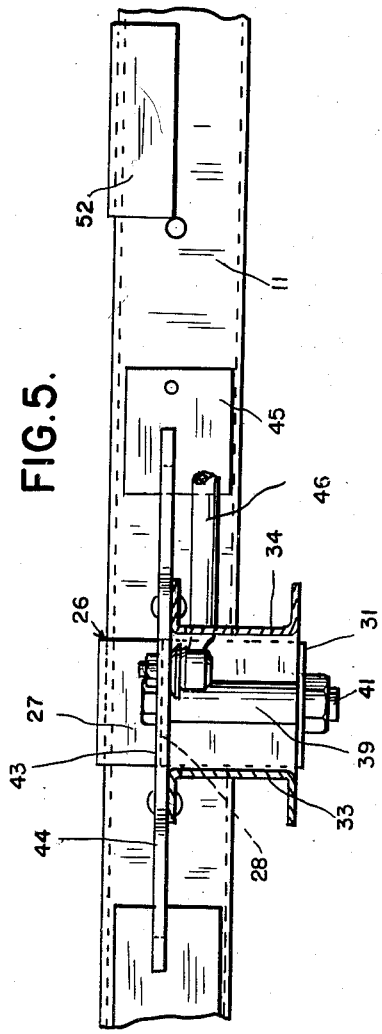
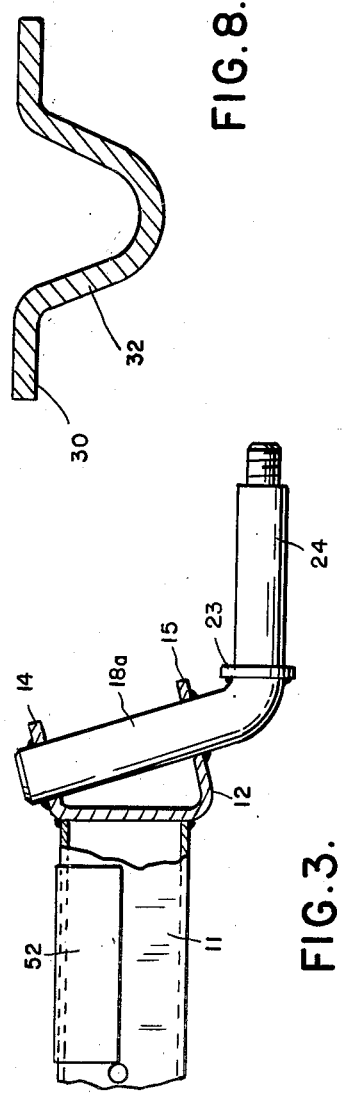
INVENTOR.
ELBERT L. POTTER
BY
Whittemore Hulbert & Belknap
ATTORNEYS Jan. 15, 1952   E. L. POTTER   2,582,455
STEERING MECHANISM
Filed Feb. 24, 1947   3 Sheets-Sheet 3
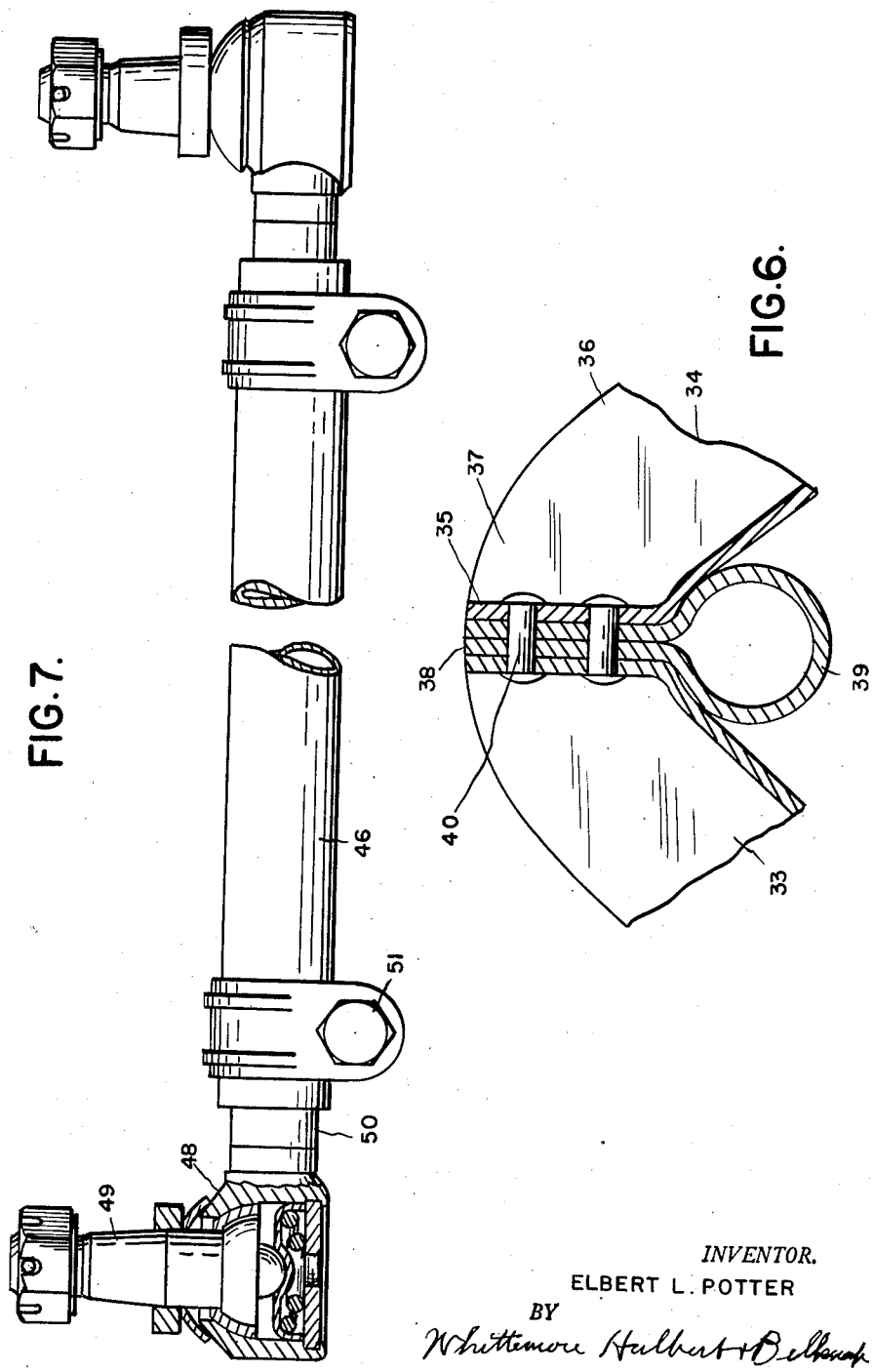
INVENTOR.
ELBERT L. POTTER
BY
ATTORNEYS Patented Jan. 15, 1952

2,582,455

UNITED STATES PATENT OFFICE 2,582,455

STEERING MECHANISM

Elbert L. Potter, Davenport, Iowa, assignor to Kelsey-Hayes Wheel Company, Detroit, Mich., a corporation of Delaware Application February 24, 1947, Serial No. 730,458

6 Claims. (Cl. 280—103)

The invention relates to axles and has for its object the obtaining of a construction which is formed in almost its entirety of pressed sheet metal members. To this end the invention consists in the construction as hereinafter set forth.

In the drawings:

Fig. 1 is a plan view of one half of my improved axle as designed for use as a front axle in cooperation with steering mechanism;

Fig. 2 is a vertical section through an end portion of the axle on line 2—2, Fig. 1;

Fig. 3 is a view similar to Fig. 2 of an axle designed for use as a rear axle;

Fig. 4 is a section on line 4—4, Fig. 1;

Fig. 5 is a section on line 5—5, Fig. 1;

Fig. 6 is a horizontal section on line 6—6, Fig. 4;

Fig. 7 is a sectional elevation of the connecting rod;

Fig. 8 is a section on line 8—8 Fig. 4.

As above stated, my improved axle is formed almost completely of pressed sheet metal members including the axle beam and mountings for the wheel spindles. The beam 10 is formed of two channel members 11, each pressed from a rectangular sheet metal blank and arranged on opposite sides of a central vertical plane with their flanges abutting. At opposite ends of the beam 10 are pressed sheet metal U-shaped members 12 each having its central portion extending in a vertical plane and secured to the beam by welding as indicated at 13. The flanges 14 and 15 of the member 12 constitute, respectively, the upper and lower end portions thereof and extend outward at a predetermined angle of upward inclination. The flange 15 is longer than the flange 14 and both flanges have circular apertures therein for receiving the shank of a wheel spindle member 16. When the axle is to be used as a front axle, as illustrated in Figs. 1 and 2, the flanges 14 and 15 are connected by a tubular member 17 which also may be formed from a sheet metal blank. This constitutes a bearing for a rockable shank 18 of the wheel spindle member 16 when the latter is used for a steering wheel. The member 16 has attached thereto a rock arm 19 which is secured to the lower portion of the shank 18 by welding as at 20. A washer 21 is placed on the shank between the member 19 and the flange 15 and a washer 22 is sleeved on the shank above the flange 14. There is also a circular flange 23 secured to the outwardly extending portion 24 of the member 16 upon which the wheel is journaled. A linch pin 25 extending through the shank 18 above the washer 22 retains the member 16 from disengagement. The rear axle construction illustrated in Fig. 3 is similar to that in Fig. 2 with the omission of the bearing member 17 and the direct attachment of the shank 18a rigidly secured to the flanges 14 and 15 by welding.

The steering mechanism, which constitutes a portion of the front axle construction, includes a pivoted tongue member and connections between the same and the rock arms 19. For securing the tongue to the axle, the latter is provided near the center thereof with a member 26 formed from pressed sheet metal. This includes a central portion which extends over the top and rear sides of the beam and also partly down the front side and beneath the rear side thereof. The portion 27 at the front extends substantially halfway down the height of the beam and terminates in the outwardly extending horizontal flange 28. The bottom portion 29 has a portion 30 depending from its forward end and terminating in the outwardly extending horizontal flange 31. The portions 29 and 30 are pressed to form a stiffening brace 32 between the beam and the flange 31. The flanges 28 and 31 have aligned apertures therein for receiving the pivot pin of the tongue which latter is preferably of the following construction.

Tongue construction 33 and 34 are channel members having the web portions 35 of their forward ends connected to each other. Extending rearward from these portions are oppositely outwardly inclined portions 36 terminating in spaced parallel portions 37. The flanges of all of these portions being horizontal and the web portions vertical. Between the forward web portions 35 are secured rearwardly extending flanges 38 of the vertical tubular member 39, which latter is located in the V-shaped space between the portions 36. Rivets 40 secure the portions 35 and 38 to each other in parallel relation. The tongue, as thus far described, is placed between the flanges 28 and 31 of the member 26 and is pivotally secured thereto by a bolt 41 thereby permitting turning of the tongue in a horizontal plane. A forward extension of the tongue (not shown) is placed between the parallel portions 37 of the members 33 and 34 and is preferably pivotally connected thereto to swing in a vertical plane. Pivot bearings 42 are secured to the webs of the portions 37 in alignment with each other to receive the pivot pin for the forward tongue. The portions 37 are also connected to each other by horizontal transversely extending brace member 43 riveted thereto. The member 43 has rearwardly inclined outward extensions 44 for engaging the beam and limiting the angular movement of the tongue. These extensions having their ends at an angle which is parallel with the beam when in contact therewith and reinforcing pads 45 are secured to the beam to receive the impact of the stop members 44.

The tongue is connected to the rock arms 19 of the wheel spindle members 16 by connecting rods 46. These, as shown, are connected at one end to the member 43 at points between the members 33 and 34 and the rods pass through apertures 47 in the webs of said members. However, this point of attachment is not necessary and if located outside of the members 33 and 34 the webs of the latter may be left imperforate. The outer ends of the rods 46 are connected to the arms 19, but inasmuch as the latter move in a plane which is inclined a universal joint is required for the connection to the rod. Preferably both ends of the rod 46 are provided with spherical bearings 48 for engaging spherical heads of pivot pins 49. These pins are connected respectively to the members 43 and arms 19 and will permit the necessary universal movement. It may also be desirable to provide for adjustment in the length of the rods 46 which may be accomplished by providing the bearings 48 with shanks 50 telescopically engaging tubular ends of the rod and secured in different positions of adjustment by clamps 51.

The construction as above described can be manufactured at relatively low cost and, with the exception of the wheel spindle member 16 and pivot pins, is formed entirely of pressed sheet metal parts. For receiving the load the axle portion is preferably reinforced by U-shaped saddle members 52 which also serve to further secure the two channel members 11 to each other.

What I claim as my invention is:

1. An axle comprising a pair of bent sheet metal straight channel members arranged on opposite sides of a vertical plane with their flanges abutting to form a box beam and U-shaped bent sheet metal end members each having the central web portion thereof in a vertical plane extending across the end of said channel members and secured thereto by welding, the flanges of said U-shaped member extending outward in parallel upwardly inclined planes, a tubular member extending through aligned apertures in said flanges and secured thereto, the axis of the tube being perpendicular to the planes of said flanges, and a wheel spindle member formed of a rod of uniform diameter having an obliquely bent shank portion extending through and journaled in said tubular member.

2. An axle comprising a pair of bent sheet metal straight channel members arranged on opposite sides of vertical plane with their flanges abutting to form a box beam and U-shaped bent shell metal end members each having the central web portion thereof in a vertical plane extending across the end of said channel members and secured thereto by welding, the flanges of said U-shaped member extending outward in parallel upwardly inclined planes, a tubular member extending through aligned apertures in said flanges and secured thereto, the axis of the tube being perpendicular to the planes of said flanges, a wheel spindle member formed of a rod of uniform diameter having the spindle proper and a bent shank extending upward therefrom at an oblique angle thereto corresponding to the angle between said beam and said inclined flanges and journalled in said tubular member, a sheet metal arm apertured for the passage of said shank therethrough and welded to said shank near the lower end thereof in predetermined angular relation to said spindle proper, a washer on said shank above said arm and below the lower one of said flanges, and means engaging said shank above the upper flange for holding the same against axial movement while permitting angular movement within said tubular member.

3. An axle comprising a pair of bent sheet metal straight channel members arranged on opposite sides of a vertical plane with their flanges abutting to form a box beam and U-shaped bent sheet metal end members each having the central web portion thereof in a vertical plane extending across the end of said channel members and secured thereto by welding, the flanges of said U-shaped member extending outward in parallel upwardly inclined planes, a bent rod wheel spindle member having a shank portion thereof extending through and journalled in aligned apertures in said flanges with its axis perpendicular to the planes thereof, a sheet metal arm apertured for the passage of said shank and welded thereto a sheet metal member at the center of said beam fashioned to surround the same with forwardly extending downwardly offset spaced horizontal flanges, a tongue member extending between and pivotally connected to said flanges, and rods connecting said tongue member with the arms of said wheel spindle members.

4. An axle comprising a pair of bent sheet metal straight channel members arranged on opposite sides of a vertical plane with their flanges abutting to form a box beam and U-shaped bent sheet metal end members each having the central web portion thereof in a vertical plane extending across the end of said channel members and secured thereto by welding, the flanges of said U-shaped member extending outward in parallel upwardly inclined planes, a bent rod wheel spindle member having a shank portion thereof extending through and journalled in aligned apertures in said flanges with its axis perpendicular to the planes thereof, a sheet metal arm apertured for the passage of said shank and welded thereto a sheet metal member at the center of said beam fashioned to surround the same with forwardly extending downwardly offset spaced horizontal flanges, said horizontal flanges having apertures therethrough, a tongue member extending between said flanges formed of a pair of channel members secured to each other at their rearward ends and having spaced forwardly extending portions, a member formed of a sheet metal blank having a central tubular portion and end portions forming flanges extending in an axial plane of said tubular portion, said flanges being between and rigidly secured to the connected rearward ends of said channel members, a pivot pin extending through apertures in said horizontal flanges and said tubular member aligned therewith to pivotally connect said tongue member with said beam, and rods connecting said tongue member to the arms of said wheel spindle members.

5. An axle comprising a pair of bent sheet metal straight channel members arranged on opposite sides of a vertical plane with their flanges abutting to form a box beam and U-shaped bent sheet metal end members each having the central web portion thereof in a vertical plane extending across the end of said channel members and secured thereto by welding, the flanges of said U-shaped member extending outward in parallel upwardly inclined planes, a bent rod wheel spindle member having a shank portion thereof extending through and journalled in aligned apertures in said flanges with its axis perpendicular to the planes thereof, a sheet metal arm apertured for the passage of said shank and welded thereto a sheet metal member at the center of said beam fashioned to surround the same with forwardly extending downwardly offset spaced horizontal flanges, said horizontal flanges having apertures therethrough, a tongue member extending between said flanges formed of a pair of channel members secured to each other at their rearward ends and having spaced forwardly extending portions a member formed of a sheet metal blank having a central tubular portion and end portions forming flanges extending in an axial plane of said tubular portion said flanges being between and rigidly secured to the connected rearward ends of said channel members, a pivot pin extending through apertures in said horizontal flanges and said tubular member aligned therewith to pivotally connect said tongue member with said beam, a member extending transversely across and attached to the spaced portions of said channel tongue members, said transverse member having extensions forming stops for contacting with said beam to limit angular movement of said tongue member, and rods connecting said tongue member to the arms of said wheel spindle members.

6. An axle comprising a pair of bent sheet metal longitudinally straight channel members arranged on opposite sides of a vertical central plane with their flanges abutting and secured to each other to form a box beam, the end of said beam being in a vertical transverse plane perpendicular to the longitudinal axis of the beam, a bent sheet metal U-shaped end member having the web portion thereof extending across and closing the space within said beam and being welded thereto along top and bottom edges thereof, and a tube extending through aligned apertures in the flanges of said U-shaped member and secured thereto to form a pivot bearing for a wheel engaging axle member.

ELBERT L. POTTER.

REFERENCES CITED

The following references are of record in the file of this patent:

UNITED STATES PATENTS

| Number | Name | Date |
| --- | --- | --- |
| 840,782 | Lindsay | Jan. 8, 1907 |
| 1,010,362 | Hawker | Nov. 28, 1911 |
| 1,536,597 | Lyndon | May 5, 1925 |
| 1,698,897 | Synck | Jan. 15, 1929 |
| 1,776,724 | Crosby | Sept. 23, 1930 |
| 1,873,444 | Maul | Aug. 23, 1932 |
| 2,047,206 | Knapp | July 14, 1936 |
| 2,114,133 | Voorhees, Jr. | Apr. 12, 1938 |
| 2,383,378 | Flumerfelt | Aug. 21, 1945 |
| 2,411,836 | Seckel | Nov. 26, 1946 |

FOREIGN PATENTS

| Number | Country | Date |
| --- | --- | --- |
| 289,684 | Great Britain | May 3, 1928 |
| 519,063 | Great Britain | Mar. 15, 1940 |